(12) United States Patent
Takahashi et al.

(10) Patent No.: US 11,239,721 B2
(45) Date of Patent: Feb. 1, 2022

(54) ELECTRIC ROTATING MACHINE, ELECTRIC ROTATING MACHINE SYSTEM, VEHICLE, POWER GENERATOR, LIFTING DEVICE, AND ROBOT

(71) Applicant: KABUSHIKI KAISHA TOSHIBA, Minato-ku (JP)

(72) Inventors: Hiroshi Takahashi, Yokohama (JP); Yasuhito Ueda, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 152 days.

(21) Appl. No.: 16/555,174

(22) Filed: Aug. 29, 2019

(65) Prior Publication Data
US 2020/0295620 A1  Sep. 17, 2020

(30) Foreign Application Priority Data
Mar. 12, 2019  (JP) .................. 2019-044828

(51) Int. Cl.
*H02K 5/08* (2006.01)
*H02K 7/00* (2006.01)
(Continued)

(52) U.S. Cl.
CPC ............... *H02K 5/08* (2013.01); *B25J 9/126* (2013.01); *F03D 9/25* (2016.05); *H02K 7/006* (2013.01); *H02K 7/1838* (2013.01); *H02K 11/33* (2016.01); *H02K 21/24* (2013.01); *B60K 6/26* (2013.01); *B60L 50/60* (2019.02); *B60L 50/70* (2019.02); *B60Y 2200/91* (2013.01); *B60Y 2200/92* (2013.01); *B60Y 2400/60* (2013.01); *B61C 3/00* (2013.01); *B66B 11/043* (2013.01); *B66C 13/00* (2013.01); *H02K 2205/12* (2013.01)

(58) Field of Classification Search
CPC ... B25J 9/126; B60K 6/26; F03D 9/25; H02K 11/33; H02K 21/24; H02K 2205/12; H02K 5/08; H02K 7/006; H02K 7/1838; B60L 2220/50; B60L 50/60; B60L 50/70; B60Y 2200/91; B60Y 2200/92; B60Y 2400/60; B61C 3/00; B66B 11/043; B66C 13/00; Y02B 10/30; Y02E 10/72; Y02T 10/64
USPC .......................................... 310/89
See application file for complete search history.

(56) References Cited

U.S. PATENT DOCUMENTS 3,293,461 A * 12/1966 Uemura .................. H02K 9/14
310/57
5,013,946 A * 5/1991 Sata .......................... G01P 3/48
310/113
(Continued)

FOREIGN PATENT DOCUMENTS

JP  2000-92772 A  3/2000
JP  2002-119030 A  4/2002
(Continued)

*Primary Examiner* — Alex W Mok
(74) *Attorney, Agent, or Firm* — Oblon, McClelland, Maier & Neustadt, L.L.P.

(57) ABSTRACT

An electric rotating machine according to an embodiment includes a stator element, a rotor element, and a housing. The rotor element is rotatable about a rotation axis. The housing houses the stator element and the rotor element, and is provided with an electric insulating portion on a part of or whole of an inner surface including a surface facing at least one of the stator element and the rotor element.

14 Claims, 13 Drawing Sheets

(51) Int. Cl.
    *H02K 7/18*     (2006.01)
    *H02K 11/33*     (2016.01)
    *H02K 21/24*     (2006.01)
    *F03D 9/25*     (2016.01)
    *B25J 9/12*     (2006.01)
    *B61C 3/00*     (2006.01)
    *B60K 6/26*     (2007.10)
    *B60L 50/60*     (2019.01)
    *B60L 50/70*     (2019.01)
    *B66B 11/04*     (2006.01)
    *B66C 13/00*     (2006.01)

(56) References Cited

U.S. PATENT DOCUMENTS

| | | | | |
|---|---|---|---|---|
| 6,169,344 | B1* | 1/2001 | Tsuruhara | H02K 11/046 310/58 |
| 2011/0254474 | A1* | 10/2011 | Saito | B60L 15/20 318/139 |
| 2012/0133225 | A1* | 5/2012 | Mizuike | H02K 1/278 310/71 |
| 2012/0249035 | A1 | 10/2012 | Ueda | |
| 2015/0084465 | A1 | 3/2015 | Takahashi et al. | |
| 2015/0349589 | A1* | 12/2015 | Takahashi | H02K 1/185 310/257 |
| 2016/0218583 | A1* | 7/2016 | Hayashi | H02K 5/10 |
| 2016/0218598 | A1* | 7/2016 | Hayashi | H02K 5/225 |
| 2016/0276880 | A1 | 9/2016 | Ueda et al. | |
| 2016/0276881 | A1 | 9/2016 | Takahashi et al. | |
| 2017/0047792 | A1* | 2/2017 | Klassen | B25J 15/0233 |
| 2017/0077792 | A1 | 3/2017 | Ueda et al. | |
| 2017/0133899 | A1* | 5/2017 | Fukuda | H02K 3/12 |
| 2017/0155297 | A1* | 6/2017 | Tokoi | H02K 7/088 |
| 2017/0163112 | A1* | 6/2017 | Tokoi | H02K 3/18 |
| 2017/0267493 | A1 | 9/2017 | Takahashi et al. | |
| 2018/0166933 | A1 | 6/2018 | Takahashi et al. | |
| 2018/0198332 | A1 | 7/2018 | Ueda et al. | |
| 2020/0295607 | A1 | 9/2020 | Ueda et al. | |

FOREIGN PATENT DOCUMENTS

| | | |
|---|---|---|
| JP | 2005-198463 A | 7/2005 |
| JP | 2005-291084 A | 10/2005 |
| JP | 2006-230142 A | 8/2006 |
| JP | 2007-306689 A | 11/2007 |
| JP | 2011-030356 A | 2/2011 |
| JP | 2012-217312 A | 11/2012 |
| JP | 2015-61495 A | 3/2015 |
| JP | 2016-178786 A | 10/2016 |
| JP | 2016-178820 A | 10/2016 |
| JP | 2017-60299 A | 3/2017 |
| JP | 2017-169343 A | 9/2017 |
| JP | 2018-98914 A | 6/2018 |
| JP | 2018-113785 A | 7/2018 |
| JP | 2020-150624 A | 9/2020 |

* cited by examiner

ELECTRIC ROTATING MACHINE, ELECTRIC ROTATING MACHINE SYSTEM, VEHICLE, POWER GENERATOR, LIFTING DEVICE, AND ROBOT

CROSS-REFERENCE TO RELATED APPLICATIONS

This application is based upon and claims the benefit of priority from Japanese Patent Application No. 2019-044828, filed on Mar. 12, 2019; the entire contents of which are incorporated herein by reference.

FIELD

Embodiments described herein relate generally to an electric rotating machine, an electric rotating machine system, a vehicle, a power generator, a lifting device, and a robot.

BACKGROUND

For reasons such as energy saving and CO2 reduction, there are increased demands for further improvements in the performance of electric rotating machines. As a result, drastic performance improvements such as size and weight reductions, improved efficiencies, increased torques, and higher outputs are being made every day. As application-specific industrial electric rotating machines, sealed electric rotating machines in which a stator element and a rotor element are housed inside of a housing are now widely being used, due to requirements such as protections against water, droplets, explosions, and dusts, magnetic shielding, sound-proofing, and cooling requirements. In such applications, a high torque is also often required. Therefore, in addition to radial-gap electric rotating machines that have already put into wide use, researches on and developments of axial-gap electric rotating machines that are characterized by their flat structure are being done actively.

However, in the conventional technologies, there are cases in which an eddy current formed by a leakage flux is generated near the inner surface of the housing.

DETAILED DESCRIPTION

Figure 1:
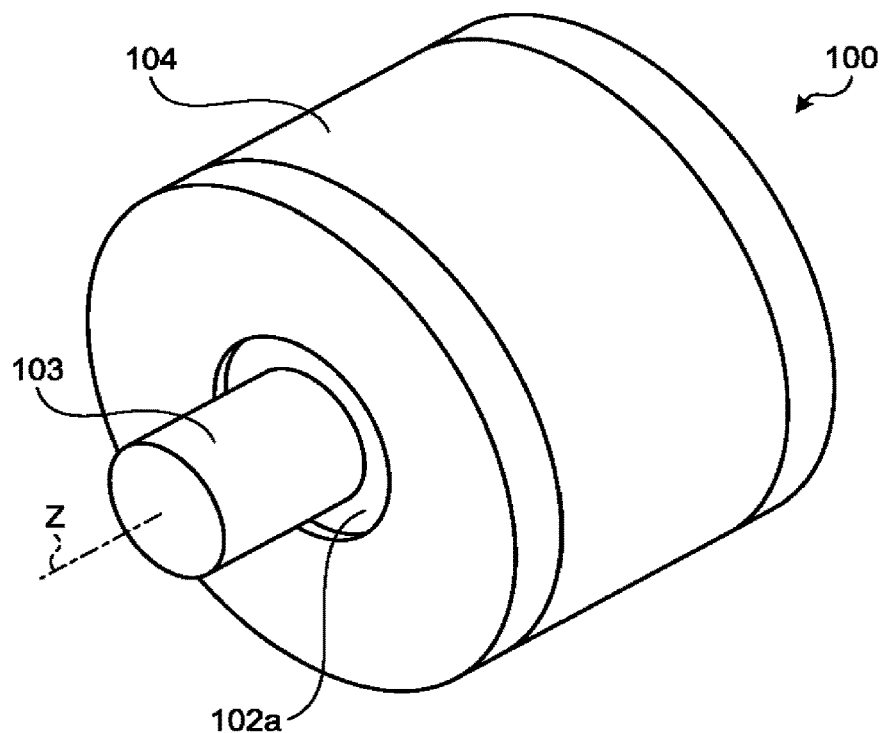
FIG. 1 is a perspective view illustrating an exemplary structure of an electric rotating machine according to a first embodiment.

An electric rotating machine according to an embodiment includes a stator element, a rotor element, and a housing. The rotor element is rotatable about a rotation axis. The housing houses the stator element and the rotor element, and is provided with an electric insulating portion on a part of or whole of an inner surface including a surface facing at least one of the stator element and the rotor element.

Some preferred embodiment of an electric rotating machine will now be explained in detail, with reference to some drawings. The configurations and control (technological characteristics) according to the embodiments described below, and the actions and results (effects) achieved by such configurations and the control are provided by way of examples only. In the exemplary embodiments and modifications thereof described below, the same elements are included. In the explanation hereunder, the same elements are given the same reference numerals, and redundant explanations thereof will be omitted.

As described earlier, in an electric rotating machine including a housing, there have been cases in which an eddy current is generated on the inner surface of the housing. Because an eddy current is a loss in the electric rotating machine, an eddy current reduces the efficiency of the electric rotating machine. In addition, there have also been cases in which the coil current becomes limited due to a reduced cooling performance in the entire electric rotating machine, and the performance such as torque becomes reduced.

As a countermeasure for suppressing an eddy current, there has been a method for suppressing a loss brought about by an eddy current in the housing by increasing the gap between the housing and at least one of the stator element and the rotor element. However, with such a method, the outer size of the housing is increased so that the size of the entire electric rotating machine is increased. Having been also available as another countermeasure is a method for forming the housing with a material on which no eddy current is generated, e.g., with resin. However, with such a method, other requirements such as those related to magnetic shielding, cooling, mechanical strength, and costs may not be satisfied. Therefore, there has been a demand for a simple and effective method for addressing various needs of the industrial sealed electric rotating machines at low costs.

Also having been disclosed as a technology for reducing the loss brought about by an eddy current in the housing is a technology for providing the housing with an opening to a section where the eddy current occurs due to the magnetic flux generated by the current flowing through the coil. However, such a technology cannot be applied to a sealed electric rotating machine because an opening is provided to the housing. Furthermore, a reduction of the housing strength is also inevitable.

Therefore, provided according to the embodiments described below is an electric rotating machine that includes a stator element and a rotor element that is housed in a housing, that is capable of suppressing a loss brought about by an eddy current caused in the housing by a leakage flux, and that is capable of improving the rotation performance, even when the gap between the housing and at least one of the stator element and the rotor element is small. The electric rotating machine according to the embodiments described below can be applied to both of a non-sealed electric rotating machine and a sealed electric rotating machine. The coil may be provided to either one of the stator and the rotor. In the explanation hereunder, an example in which the coil is provided to the stator will be mainly explained.

First Embodiment

Figure 2:
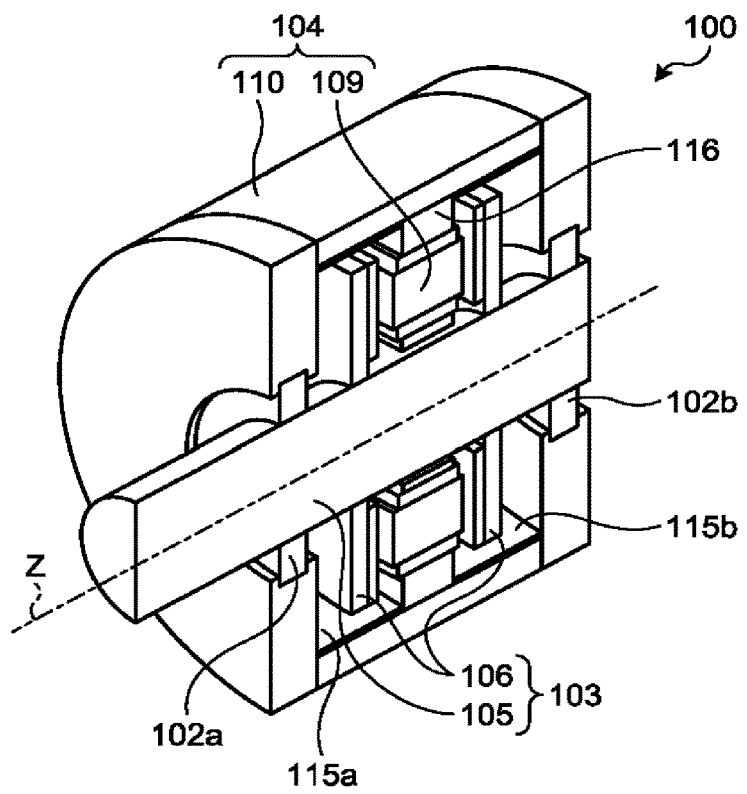
FIG. 2 is a perspective sectional view of the electric rotating machine according to the first embodiment, sectioned vertically.
Figure 3:
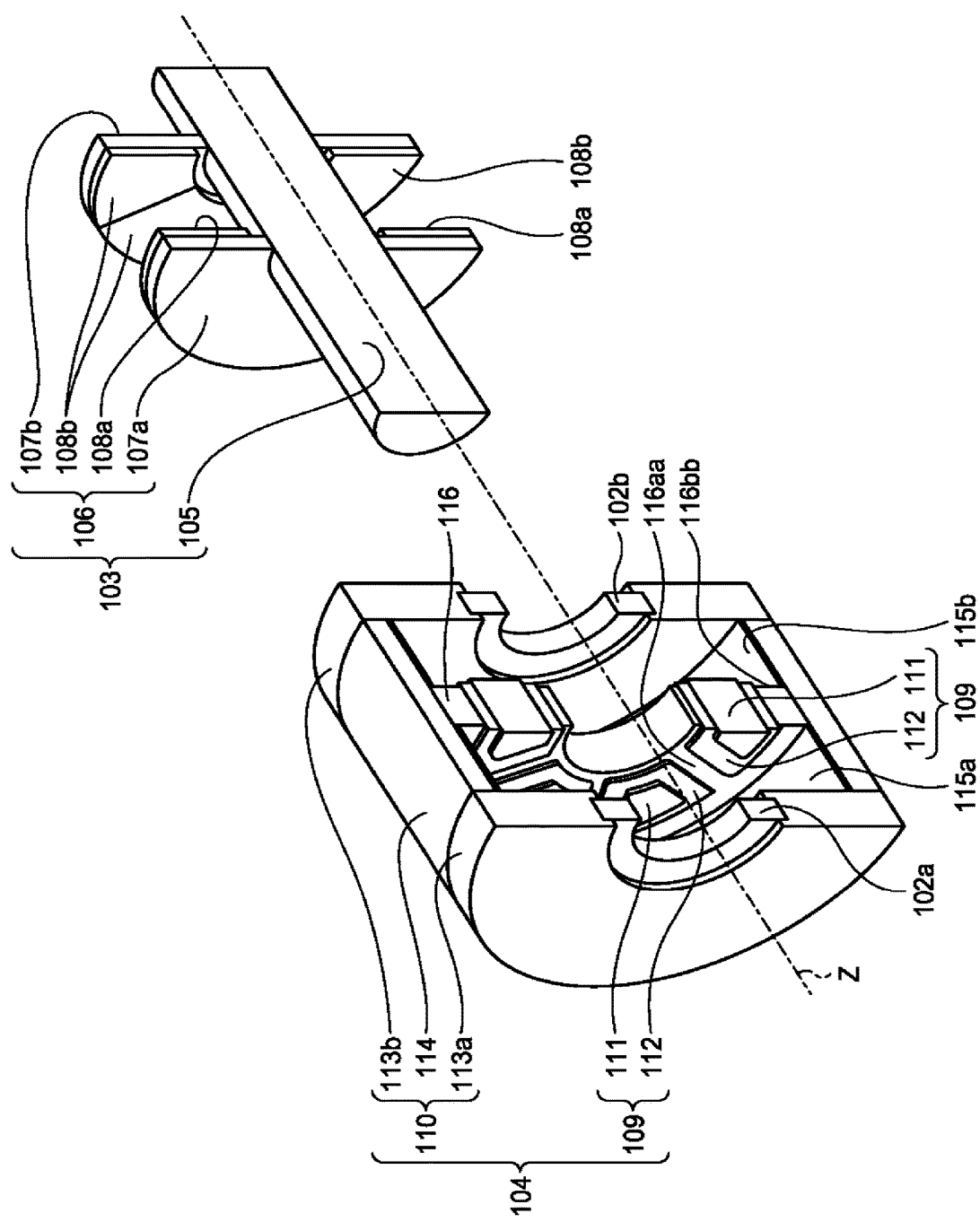
FIG. 3 is an exploded perspective view illustrating a plot of disassembled parts of a rotor and a stator according to the first embodiment.
Figure 4:
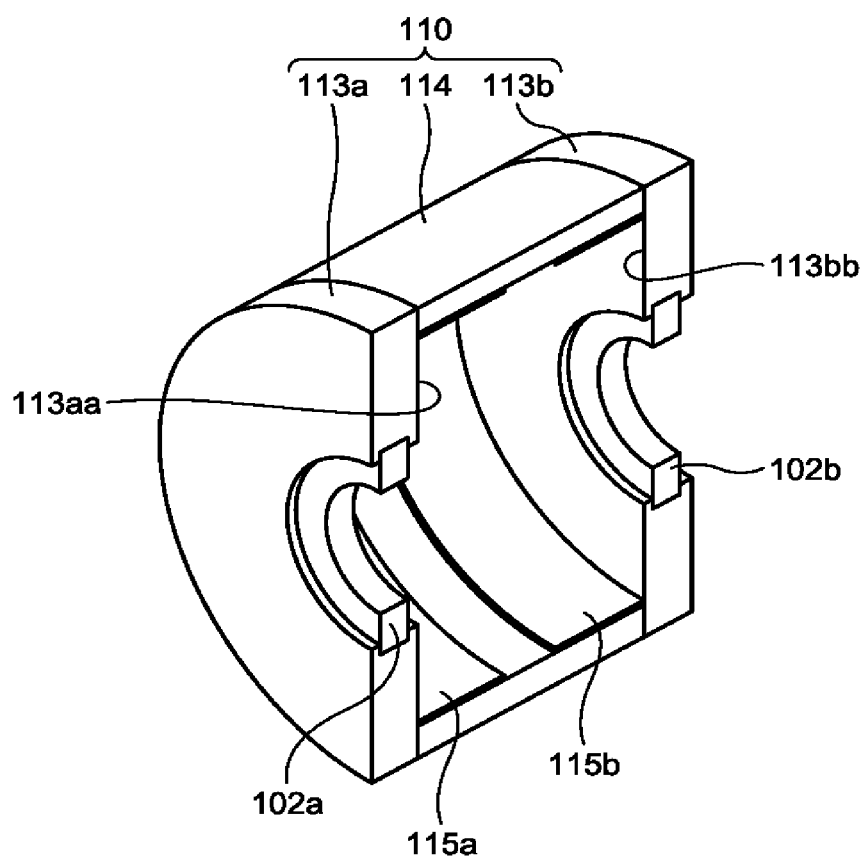
FIG. 4 is a perspective sectional view for explaining a housing according to the first embodiment in detail.

A first embodiment will now be explained with reference to FIGS. 1 to 4. FIG. 1 is a perspective view illustrating an exemplary structure of an electric rotating machine 100 according to the first embodiment. FIG. 2 is a perspective sectional view of the electric rotating machine 100, sectioned vertically along a Z direction that is the axial direction of the rotation axis. FIG. 3 is an exploded perspective view illustrating a plot of disassembled parts of a rotor 103 and a stator 104 along the Z direction. FIG. 4 is a perspective sectional view for explaining a housing 110 in detail.

As illustrated in FIGS. 1 and 2, the electric rotating machine 100 includes the rotor 103 and the stator 104. The rotor 103 is supported rotatably by bearings 102a, 102b in the Z direction. The stator 104 is provided in a manner surrounding the entire rotor 103.

The rotor 103 includes a shaft 105 and a rotor element 106. The rotor element 106 has a disk-like shape that is arranged in a manner allowing the shaft 105 to be inserted therethrough.

As illustrated in FIG. 3, the rotor element 106 has two rotor element cores 107a, 107b. A permanent magnet 108a and a permanent magnet 108b are provided to the facing surfaces of the rotor element core 107a and of the rotor element core 107b, respectively, the facing surfaces facing each other along the Z direction.

Each of the permanent magnets 108a, 108b is arranged in plurality, along the rotating direction of the rotation axis. The magnetization directions (N pole, S pole) in the Z direction are different from each other in the adjacent permanent magnets 108a. In the same manner, the magnetization directions (N pole, S pole) in the Z direction are different from each other in the adjacent permanent magnets 108b. Furthermore, the magnetization directions (N pole, S pole) are different from each other in the permanent magnet 108a and the permanent magnet 108b facing each other in the Z direction.

The stator 104 includes a stator element 109 and the housing 110. The stator element 109 includes a plurality of stator element cores 111, and windings 112 surrounding the stator element cores 111, respectively. The housing 110 supports the stator element 109 and the bearings 102a, 102b. The housing 110 includes bearing holders 113a, 113b, an outer frame 114, and electric insulating portions 115a, 115b.

The electric insulating portions 115a, 115b are formed on at least a part of the inner surface of the outer frame 114. The electric insulating portions 115a, 115b are layer-like electric insulating members (electric insulating layers), for example, and are formed with an electric insulation film, or formed by applying an electric insulating agent. The stator element cores 111 and the windings 112 are fixed to the outer frame 114 via the stator element holder 116. The electric insulating portions 115a, 115b may be formed on recessed portions that are formed on at least a part of the inner circumferential surface of the outer frame 114, for example, in the same manner as in a second embodiment, which will be described later.

The magnetic circuit in the permanent magnets 108a, 108b forms a closed loop mainly passing through the permanent magnet 108a, the stator element core 111, the permanent magnet 108b, the rotor element core 107b, the permanent magnet 108b, the stator element core 111, the permanent magnet 108a, and the rotor element core 107a, in the order listed herein. In the same manner, the magnetic flux generated by applying a current to the windings 112 also forms a closed-loop magnetic circuit mainly passing through the stator element core 111, the permanent magnet 109b, the rotor element core 107b, the permanent magnet 108b, the stator element core 111, the permanent magnet 108a, the rotor element core 107a, and the permanent magnet 108a, in the order listed herein. These orders are merely one example, and may be changed depending on the design or the direction in which the current is applied.

The electric rotating machine 100 operates as a motor that generates a torque about the rotation axis, with the magnetic interaction between these two magnetic circuit. At this time, a leakage flux may be generated in the two magnetic circuits. Such a leakage flux is generated easily when the applied current is high, or when the magnetic gap between the rotor element and the stator element is wide, for example.

To address this issue, the electric rotating machine 100 according to the embodiment, the electric insulating portions 115a, 115b are formed on the inner surface of the outer frame 114 that faces the stator element 109 and the rotor element 106. With this structure, even if a leakage flux is generated, an eddy current flowing on the inner surface of the outer frame 114 can be suppressed. Furthermore, even if the gap between the outer frame 114, and the stator element 109 and the rotor element 106 is reduced, it is possible to suppress an eddy current generated on the inner surface of the outer frame 114. Therefore, the size of the stator 104 can be reduced, while suppressing a reduction in the efficiency of the electric rotating machine 100 due to an increased loss.

The torque characteristics can be improved, in particular, during a high-speed rotation in which a loss caused by an eddy current is caused easily.

Explained above is an example in which the electric insulating portion (the electric insulating portions 115a, 115b) is formed on a part of the inner surface of the outer frame 114, but the area on which the electric insulating portion is formed is not limited thereto. For example, the electric insulating portion may be formed generally on the entire area of the inner surface of the housing 110, including inner surfaces 113aa, 113bb of the bearing holders 113a, 113b, and outer surfaces 116aa, 116bb of the stator element holder 116.

Second Embodiment

Figure 5:
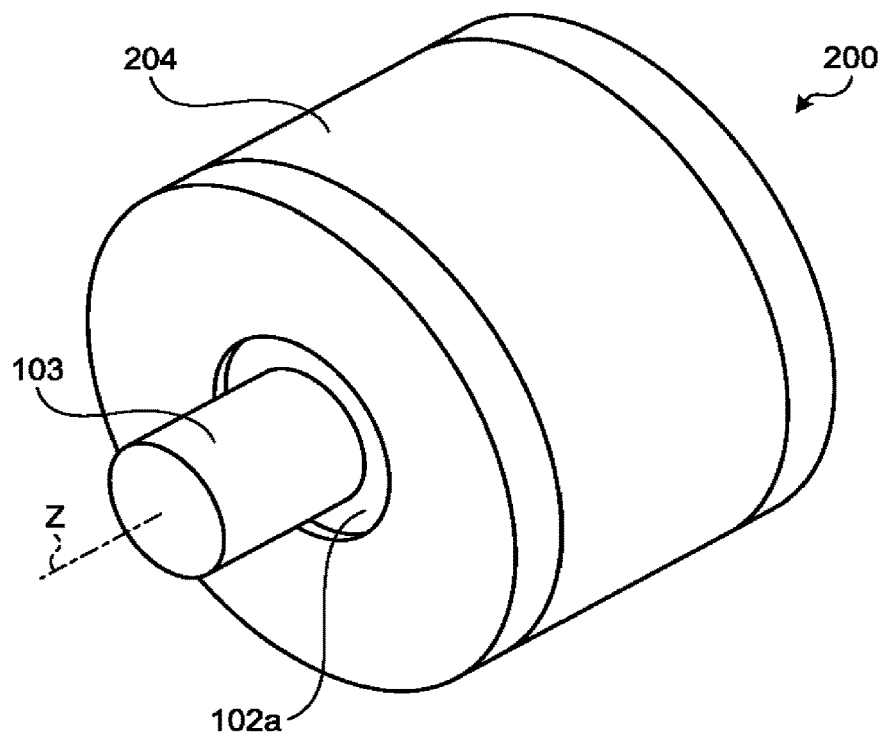
FIG. 5 is a perspective view illustrating an exemplary structure of an electric rotating machine according to a second embodiment.
Figure 6:
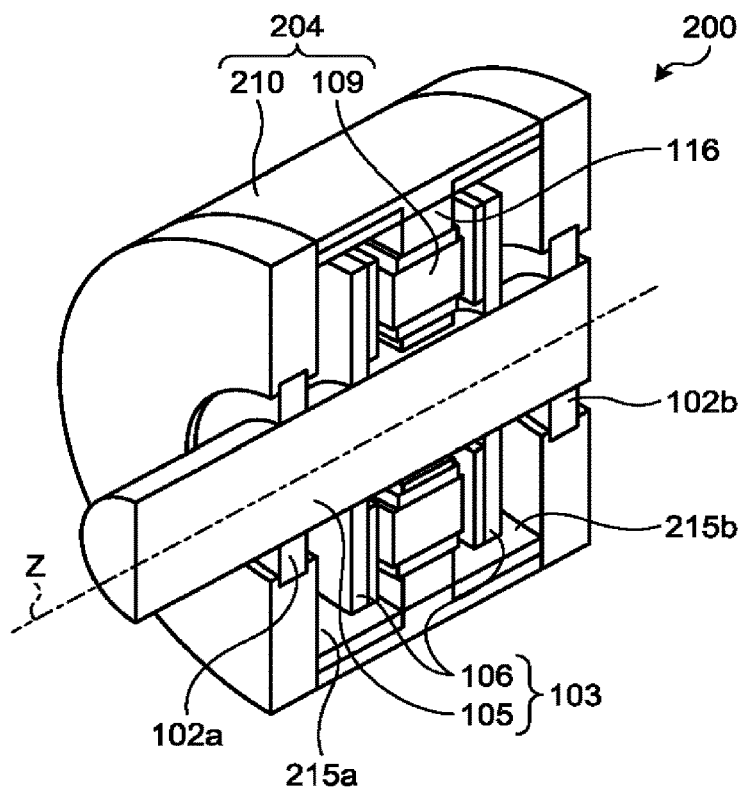
FIG. 6 is a perspective sectional view of the electric rotating machine according to the second embodiment, sectioned vertically.
Figure 7:
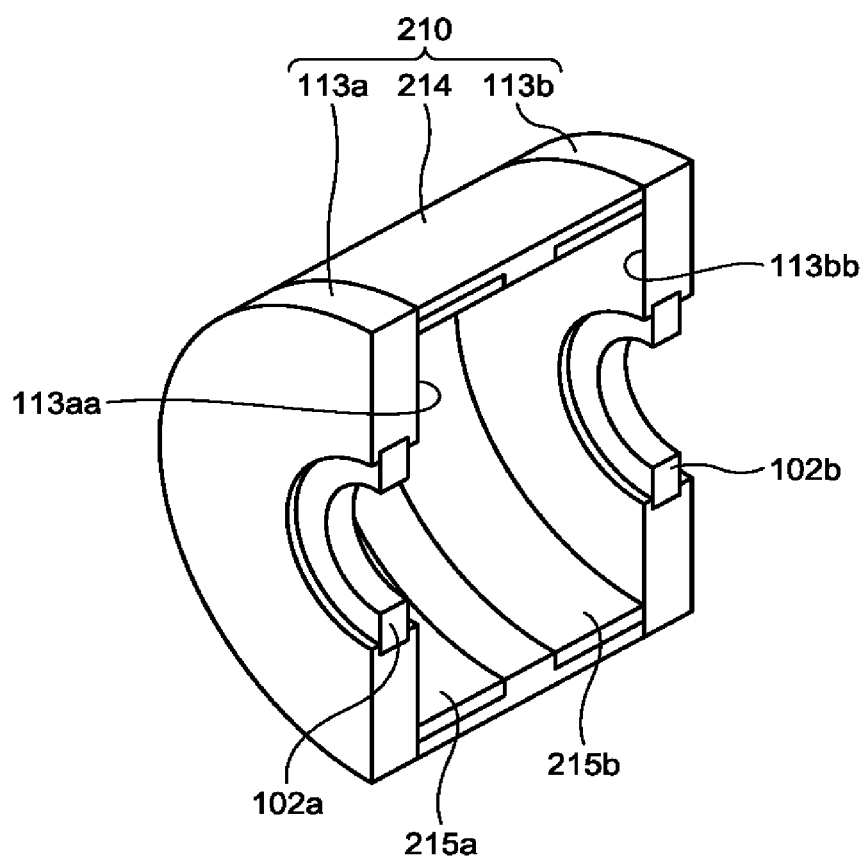
FIG. 7 is a perspective sectional view for explaining a housing according to the second embodiment in detail.

An electric rotating machine 200 according to a second embodiment will now be explained with reference to FIGS. 5 to 7. FIG. 5 is a perspective view illustrating an exemplary structure of the electric rotating machine 200 according to the second embodiment. FIG. 6 is a perspective sectional view of the electric rotating machine 200, sectioned vertically along the Z direction. FIG. 7 is a perspective sectional view for explaining a housing 210 in detail.

The electric rotating machine 200 has some parts that are common with those in the electric rotating machine 100 according to the first embodiment. Such common parts will be given the same reference numerals, and explanations thereof will be omitted. The same applies to the embodiments described below.

The electric rotating machine 200 includes the rotor 103 and a stator 204. The stator 204 is provided in a manner surrounding the entire rotor 103. The stator 204 includes the stator element 109 and a housing 210. The housing 210 supports the stator element 109 and the bearings 102a, 102b. The housing 210 includes the bearing holders 113a, 113b, an outer frame 214, and electric insulating portions 215a, 215b.

The electric insulating portions 215a, 215b are provided to at least a part of the inner surface of the outer frame 214. The stator element holder 116 is fixed to the outer frame 214.

The electric insulating portions 215a, 215b are formed in a manner inserted into recessed portions that are formed in at least a part of the inner circumferential surface of the outer frame 214, for example. Therefore, it is not necessary to perform an insulating process, such as a process for forming the electric insulation film or a process for applying the electric insulating agent, as required for the electric insulating portions 115a, 115b according to the first embodiment. Furthermore, the electric insulating portions 215a, 215b can be shaped to have a greater thickness compared with the electric insulating portions 115a, 115b formed using an electric insulation film or formed by the electric insulating agent applied. Therefore, the tolerance against the damages of the surface, for example, can be improved.

Third Embodiment

Figure 8:
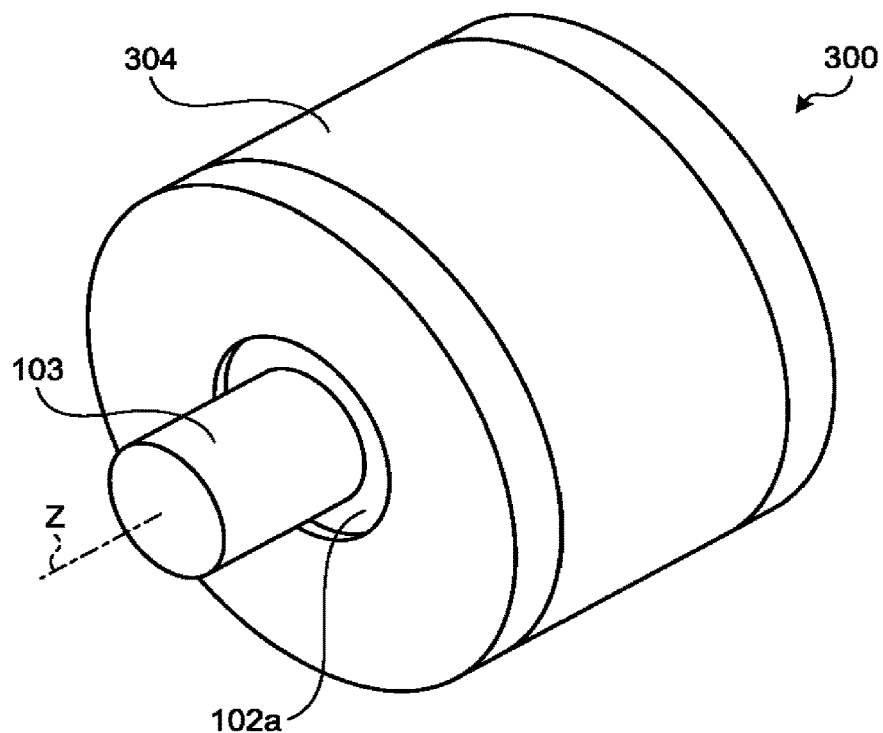
FIG. 8 is a perspective view illustrating an exemplary structure of an electric rotating machine according to a third embodiment.
Figure 9:
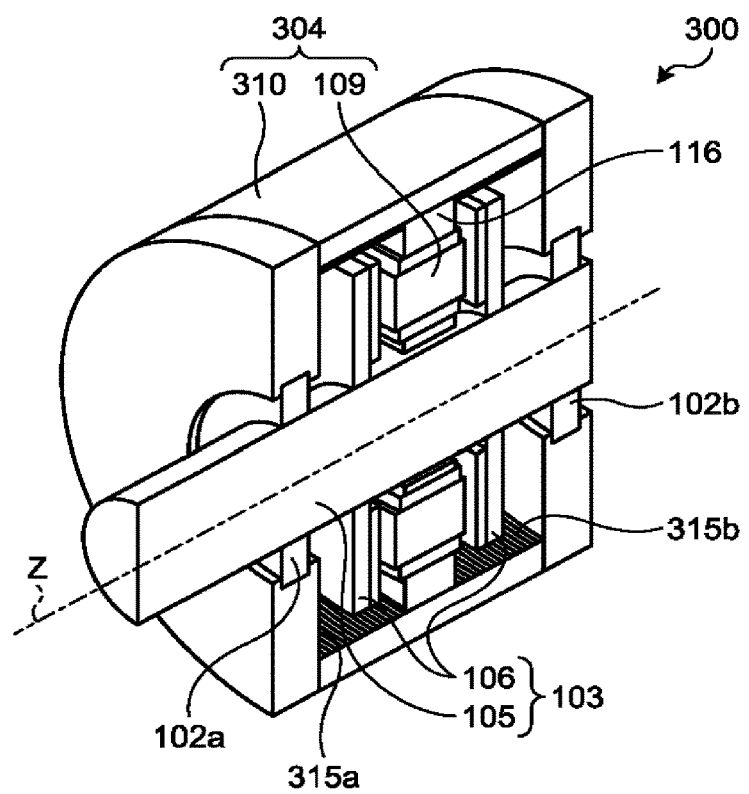
FIG. 9 is a perspective sectional view of an electric rotating machine according to the third embodiment, sectioned vertically.
Figure 10:
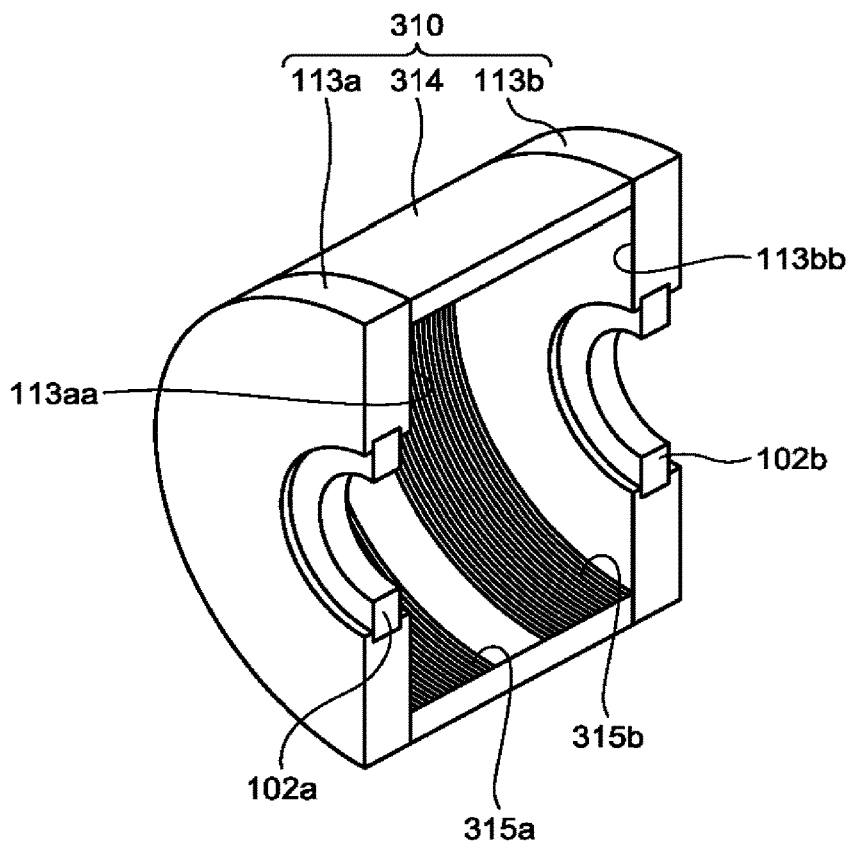
FIG. 10 is a perspective sectional view for explaining a housing according to the third embodiment in detail.
Figure 11:
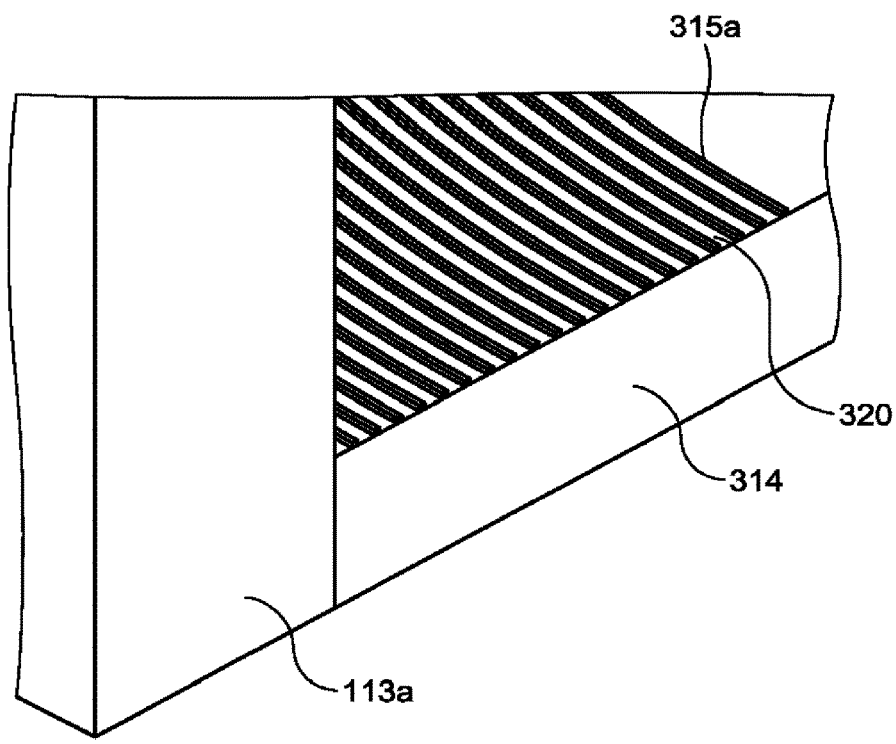
FIG. 11 is an enlarged view of a part of FIG. 10, for explaining electric insulating portions.

An electric rotating machine 300 according to a third embodiment will now be explained with reference to FIGS. 8 to 11. FIG. 8 is a perspective view illustrating an exemplary structure of the electric rotating machine 300 according to the third embodiment. FIG. 9 is a perspective sectional view of the electric rotating machine 300, sectioned vertically along the Z direction. FIG. 10 is a perspective sectional view for explaining a housing 310 in detail. FIG. 11 is an enlarged view of a part of FIG. 10, for explaining electric insulating portions 315a.

The electric rotating machine 300 includes the rotor 103 and a stator 304. The stator 304 is provided in a manner surrounding the entire rotor 103. The stator 304 includes the stator element 109 and the housing 310. The housing 310 supports the stator element 109 and the bearings 102a, 102b. The housing 310 includes the bearing holders 113a, 113b, an outer frame 314, and electric insulating portions 315a, 315b.

The electric insulating portions 315a, 315b are formed on at least a part of the inner surface of the outer frame 314. The stator element holder 116 is fixed to the outer frame 314.

The electric insulating portions 315a, 315b is formed using an electric insulation film, or is formed by applying an electric insulating agent, for example. As illustrated in FIG. 11, the electric insulating portions 315a, 315b are formed to include gaps 320 that are arranged at a predetermined interval along the Z direction, and that extend in the rotating direction of the rotation axis. As a method for forming the electric insulating portions 315a, 315b, a plurality of ring-shaped electric insulating portions 315a, 315b may be arranged at a predetermined interval, or each of the electric insulating portions 315a, 315b may include one or more parts that are formed in a spiral shape. Furthermore, the electric insulating portions 315a, 315b may be provided to recessed portions that are formed on at least a part of the inner circumferential surface of the outer frame 314, in the same manner as in the second embodiment.

According to this embodiment, the amount of the material required in the insulating process can be reduced, compared with the electric insulating portions that are formed continuously on the inner surface of the outer frame 114 (the electric insulating portions 115a, 115b, the electric insulating portions 215a, 215b), while suppressing a loss caused by an eddy current. The predetermined interval, the length of the layer, and the like may be set to appropriate values depending on the design or the like of the electric rotating machine.

Fourth Embodiment

Figure 12:
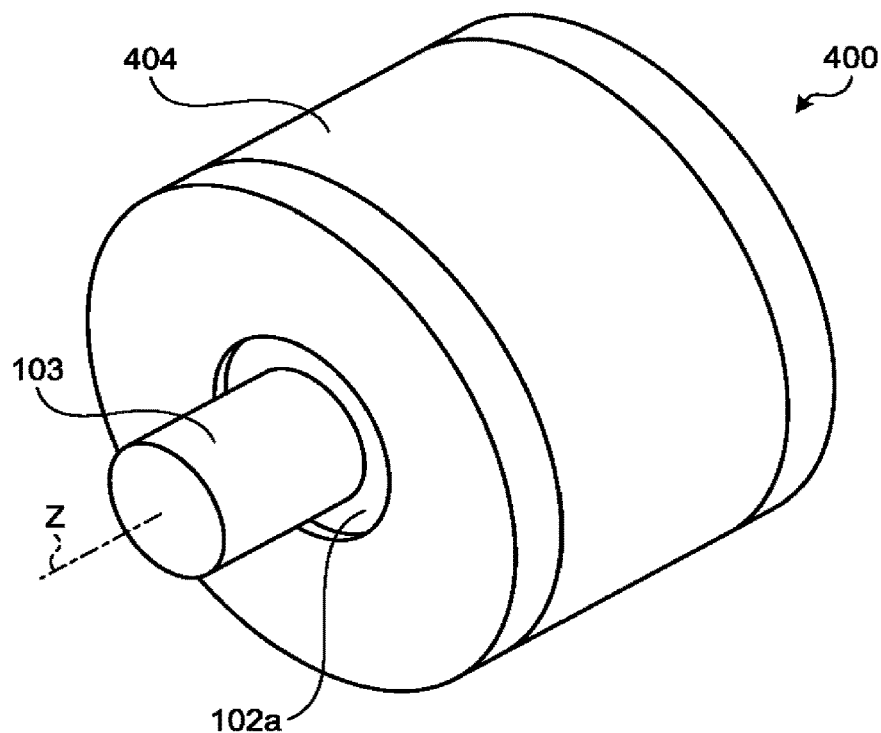
FIG. 12 is a perspective view illustrating an exemplary structure of an electric rotating machine according to a fourth embodiment.
Figure 13:
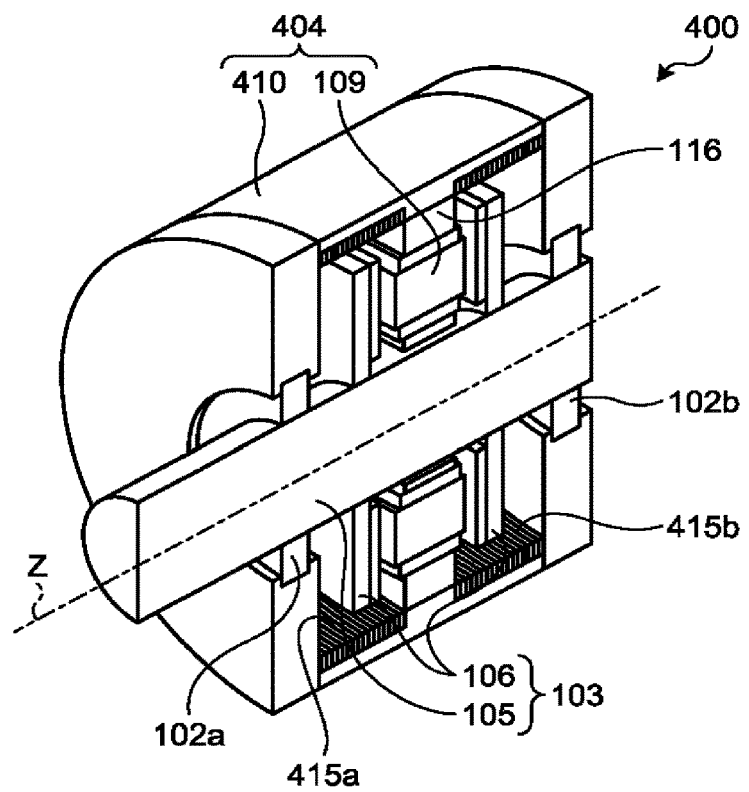
FIG. 13 is a perspective sectional view of the electric rotating machine according to the fourth embodiment, sectioned vertically.
Figure 14:
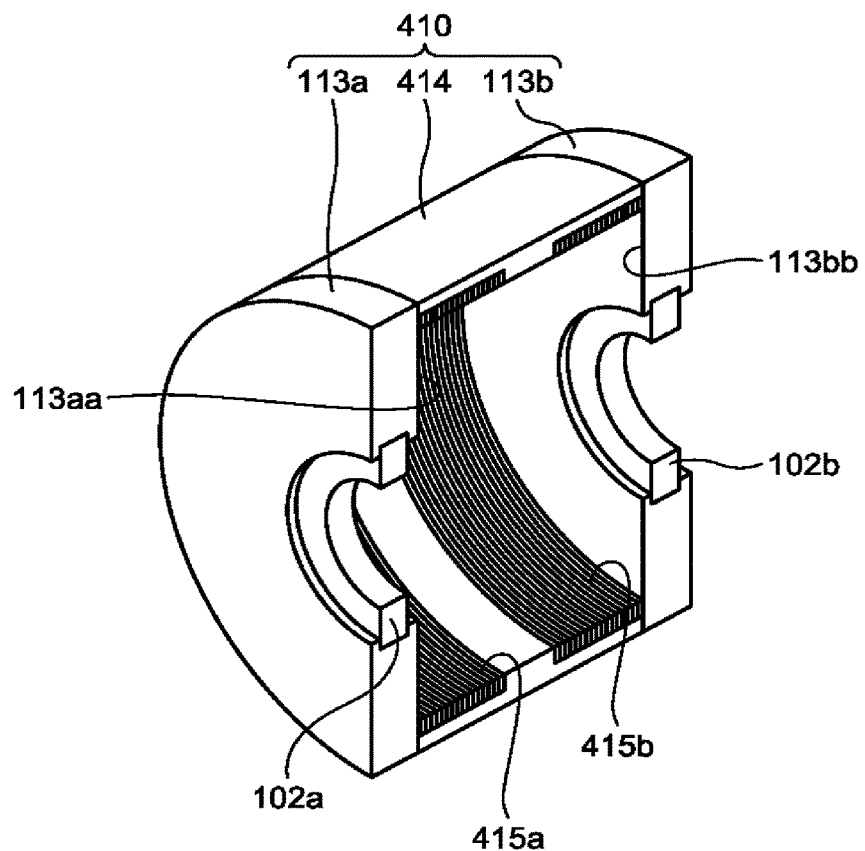
FIG. 14 is a perspective sectional view for explaining a housing according to the fourth embodiment in detail.
Figure 15:
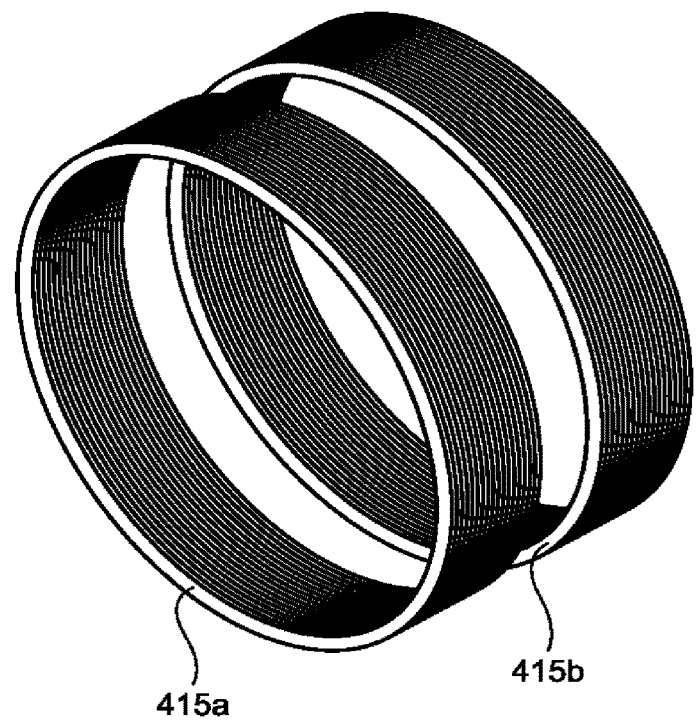
FIG. 15 is a schematic for explaining an exemplary structure of steel sheet laminations according to the fourth embodiment.

An electric rotating machine 400 according to a fourth embodiment will now be explained with reference to FIGS. 12 to 15. FIG. 12 is a perspective view illustrating an exemplary structure of the electric rotating machine 400 according to the fourth embodiment. FIG. 13 is a perspective sectional view of the electric rotating machine 400, sectioned vertically along the Z direction. FIG. 14 is a perspective sectional view for explaining a housing 410 in detail. FIG. 15 is a schematic for explaining an exemplary structure of steel sheet laminations 415a, 415b.

The electric rotating machine 400 includes the rotor 103 and a stator 404. The stator 404 is provided in a manner surrounding the entire rotor 103. The stator 404 includes the stator element 109 and the housing 410. The housing 410 supports the stator element 109 and the bearings 102a, 102b. The housing 410 includes the bearing holders 113a, 113b, an outer frame 414, and steel she laminations 415a, 415b.

The steel sheet laminations 415a, 415b are formed in a manner inserted into recessed portions formed on at least a part of the inner circumferential surface of the outer frame 414, for example. The stator element holder 116 is fixed to the outer frame 414.

The steel sheet laminations 415a, 415b are formed by laminating one or more steel sheets in the Z direction. At least a par outer surface of each of the steel sheets is provided with an electric insulating portion that is formed with an electric insulation film, or is formed by applying an electric insulating agent.

The steel sheet laminations 415a, 415b are formed by laminating one or more steel sheets in a spiral shape, in the Z direction, for example. The steel sheet laminations 415a, 115b may also be formed by laminating a plurality of ring-shaped steel sheets along the Z direction.

The ring-shaped steel sheets are formed by cutting (punching) a steel sheet having an electric insulating portion formed on the outer surface, into a ring-shape, for example. With such a formation method, however, there are some cases in which no electric insulating portion remains on the cut surface, but the electric insulating portion remains on the other surface. Therefore, by laminating such ring-shaped steel sheets, it is possible to form electric insulating portions including gaps 320 at a predetermined interval, in the same manner as in the third embodiment.

The method for forming the steel sheet laminations 415a, 415b is not limited thereto. For example, the steel sheet laminations 415a, 415b may also be formed by laminating a plurality of ring-shaped steel sheets and a plurality of ring-shaped electric insulating portions alternatingly.

According to this embodiment, a loss caused by an eddy current generated on the inner surface of the outer frame 414 can be reduced effectively, and also because steel sheet laminations that are generally widely used as a material of the electric rotating machines are used, it is not necessary to introduce a new special manufacturing facility and the like.

Modifications

In the embodiments described above, a double rotor-single stator axial-gap electric rotating machine is used as a typical example of the electric rotating machine 100, 200, 300, 400, but applicable electric rotating machines are not limited thereto.

For example, the embodiments can be also applied to single rotor-double stator axial-gap electric rotating machine, and outer-rotor or inner-rotor radial-gap electric rotating machine. Furthermore, the embodiments can be also applied to axial-gap and radial-gap transverse flux electric rotating machines.

The transverse flux electric rotating machines are also referred to as transversal flux electric rotating machines. In a transverse flux electric rotating machine that uses an annular housing, an eddy current circulating about rotation axis may be generated inside the housing. As a countermeasure for a loss caused by such a circulating eddy current, it is effective to use an electric rotating machine with the following modifications applied to the electric rotating machine 100 according to the first embodiment, the electric rotating machine 200 according to the second embodiment, or the electric rotating machine 300 according to the third embodiment.

Used in an electric rotating machine that is a modification of the electric rotating machine 300 are electric insulating portions that are arranged at a predetermined interval along the rotating direction of the rotation axis, instead of the electric insulating portions 315a, 315b, and that include gaps extending along the direction.

In this manner, the electric insulating portions may be formed to include some gaps at a predetermined interval along the rotating direction of the rotation axis. Furthermore, the electric insulating portions may have a net-like (mesh-like) shape. In other words, the electric insulating portions may be formed to include one or more gaps extending along at least one of the axial direction of the rotation axis (Z direction) and the rotating direction of the rotation axis.

As described above, the electric rotating machine according to the first to the fourth embodiments includes an electric insulating portion on the whole or a part of the inner surface of the housing including a surface facing one or both of the stator element and the rotor element. With this structure, even when the leakage flux from one or both of the stator element and the rotor element affects the housing, an eddy current flowing on the inner surface of the housing can be suppressed. As a result, it is possible to suppress a reduction in the efficiency due to an increased loss in the electric rotating machine. The torque characteristics can be improved, in particular, during a high-speed rotation in which a loss caused by an eddy current is caused easily. Even if the gap between the housing, and the stator element and the rotor element is reduced, the eddy current generated on the inner surface of the housing can be suppressed. Therefore, the size of the housing can be further reduced while suppressing a reduction in the efficiency of the electric rotating machine due to an increased loss.

In the manner described above, with an electric rotating machine in which a loss in the housing is reduced, it is possible to achieve a sealed electric rotating machine satisfying requirements such as protections against water, droplets, explosions, and dusts, magnetic shielding, sound-proofing, and cooling requirements, while achieving a rotation performance, particularly, high output and high torque. Therefore, the electric rotating machine can be used as a high-torque, high-output driving source or a large power generator in the fields in which extremely high torque and high output density are required (e.g., working machines, marine vessels, automobiles, and robots).

Some application examples in an electric rotating machine system, a vehicle (e.g., an automobile or a train car), a power generator (e.g., a wind power generator), a lifting device (e.g., an elevator or a crane), and a robot will now be explained. In the description below, application examples of the electric rotating machine 100 according to the first embodiment will be explained, but it is also possible to apply the electric rotating machine according to the other embodiments.

Electric Rotating Machine System

Figure 16:
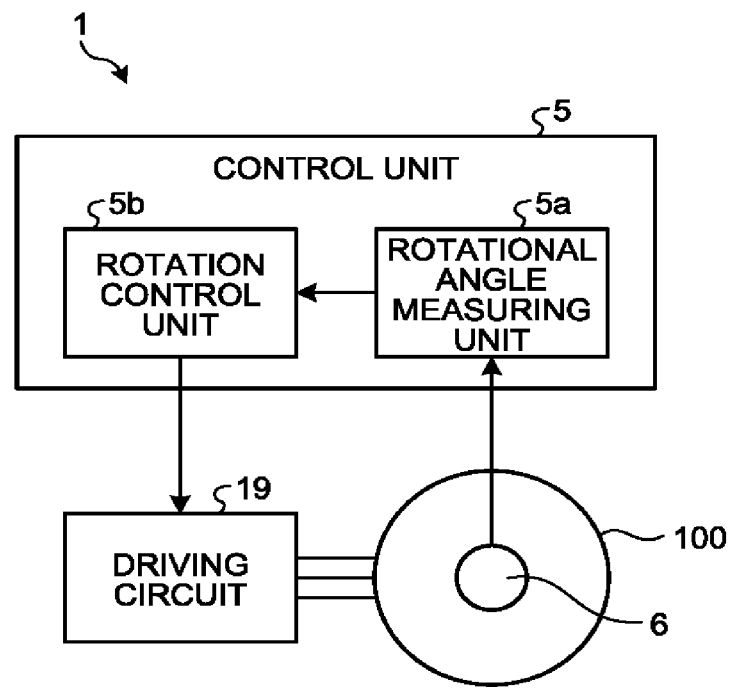
FIG. 16 is a block diagram of an electric rotating machine system including the electric rotating machine according to the embodiment.

FIG. 16 is a block diagram illustrating an exemplary configuration of an electric rotating machine system 1 including the electric rotating machine 100. As illustrated in FIG. 16, the electric rotating machine system 1 includes a driving circuit 19, an angle sensor 6, and a control unit 5.

The driving circuit 19 supplies power to the electric rotating machine 100, under the control of the control unit 5. The driving circuit 19 is provided with a battery, for example, as a power supply source (power source).

The angle sensor 6 includes a rotary encoder, for example, and detects the rotational angle of the rotor element 106 in the electric rotating machine 100. Instead of detecting the rotational angle of the rotor element 106 with the angle sensor 6, the rotational angle may also be estimated based on the power output from the driving circuit 19, which will be described later, and on a physical model of the electric rotating machine 100. Such an estimation may also be referred to as a sensorless position estimation.

The control unit 5 controls the operations of the driving circuit 19. The control unit 5 includes a rotational angle measuring unit 5a and a rotation control unit 5b. The rotational angle measuring unit 5a outputs rotational angle information based on a detection result of the angle sensor 6. The rotation control unit 5b obtains a command value in accordance with a predetermined algorithm, based on the rotational angle information, on a required value received from the external, and the like, and controls the driving circuit 19 to apply power that is based on the command value to the electric rotating machine 100. The control unit 5 can perform an angle feedback control of the electric rotating machine 100 bared on the detection result from the angle sensor 6 or on the sensorless position estimation.

Application Example in Vehicle

Figure 17:
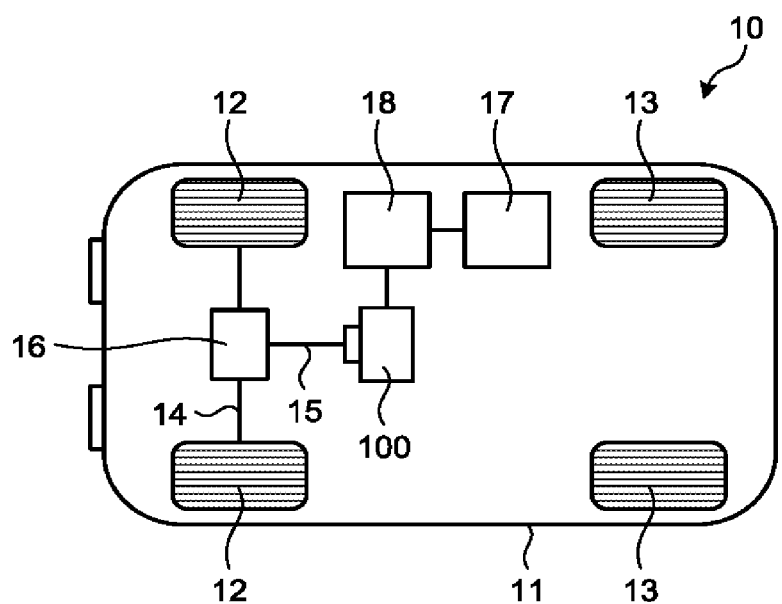
FIG. 17 is a schematic illustrating a general structure of a vehicle including the electric rotating machine according to the embodiment.

FIG. 17 is a general hematic of a structure of a vehicle 10 including the electric rotating machine 100. The vehicle 10 (machine) may include the electric rotating machine 100 according to the first embodiment. In the example illustrated in FIG. 17, the vehicle 10 is what is called a hybrid car. A body 11 of the vehicle 10 has two front wheels 12 and two rear wheels 13. The front wheels 12 are driving wheels (actuating unit), and is connected to the electric rotating machine 100 via a driving shaft 14, a differential gear 16, and a driving shaft 15. The driving shaft 15 is connected to the shaft 105 (the rotor element 106) of the electric rotating machine 100. The vehicle 10 also includes an engine 17. The engine 17 is connected to the electric rotating machine 100 or the driving shaft 15 via a coupling shaft 18. With such a configuration, the torque of the engine 17 and the driving power of the electric rotating machine 100 are both communicated to the front wheels 12.

Figure 18:
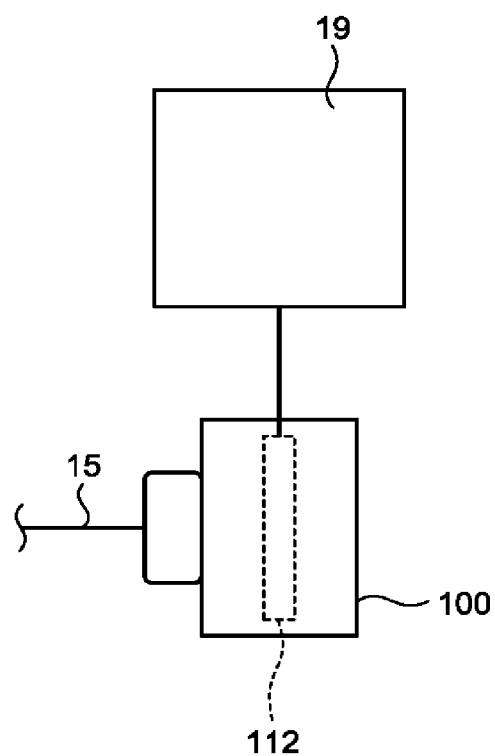
FIG. 18 is a schematic of a structure of the electric rotating machine installed in the vehicle.

FIG. 18 is a schematic of a structure of the electric rotating machine 100 installed in the vehicle 10. As illustrated in FIG. 18, the power line of the driving circuit 19 is connected to the windings 112 included in the electric rotating machine 100. The electric rotating machine 100 operates as a motor in an operation of driving the vehicle, and operates as a generator in an operation of power regeneration.

The vehicle 10 is not limited to a hybrid vehicle, and may be an electric vehicle without the engine 17, or a fuel cell vehicle, for example.

Application Example in Wind Power Generator

Figure 19:
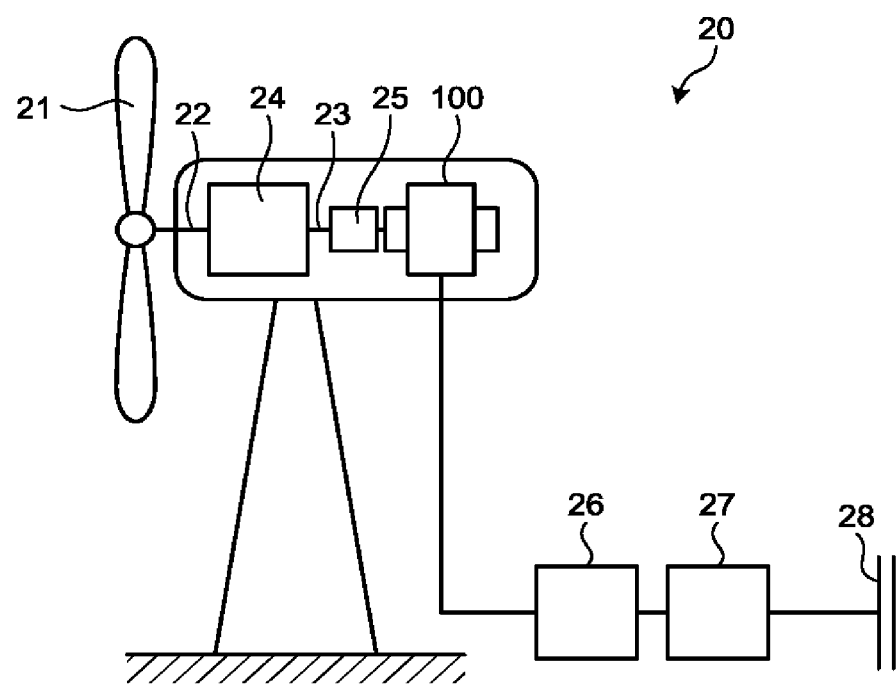
FIG. 19 is a schematic illustrating a general structure of a wind power generator including the electric rotating machine according to the embodiment.

FIG. 19 is a general schematic of a structure of a wind power generator 20 including the electric rotating machine 100. The wind power generator 20 (machine) may include the electric rotating machine 100 according to the first embodiment. In the example illustrated in FIG. 19, blades 21 (actuating unit) of the wind power generator 20 are rotated by the force of wind, and the driving power is communicated to a speed increaser 24 via a rotating shaft 22. The driving power of the speed increaser 24 is communicated to the shaft 105 (the rotor element 106) of the electric rotating machine 100 via a rotating shaft 23 and a shaft coupling 25, and the electric rotating machine 100 generates power with the driving power. The generated power is supplied to a power grid 28 via a transformer 26 and a grid protection device 27.

The electric rotating machine 100 according to the first embodiment may also be applied to any power generator other than such a wind power generator 20, e.g., a power generator a typical example of which is a hydroelectric power generator.

Application Example in Elevator

Figure 20:
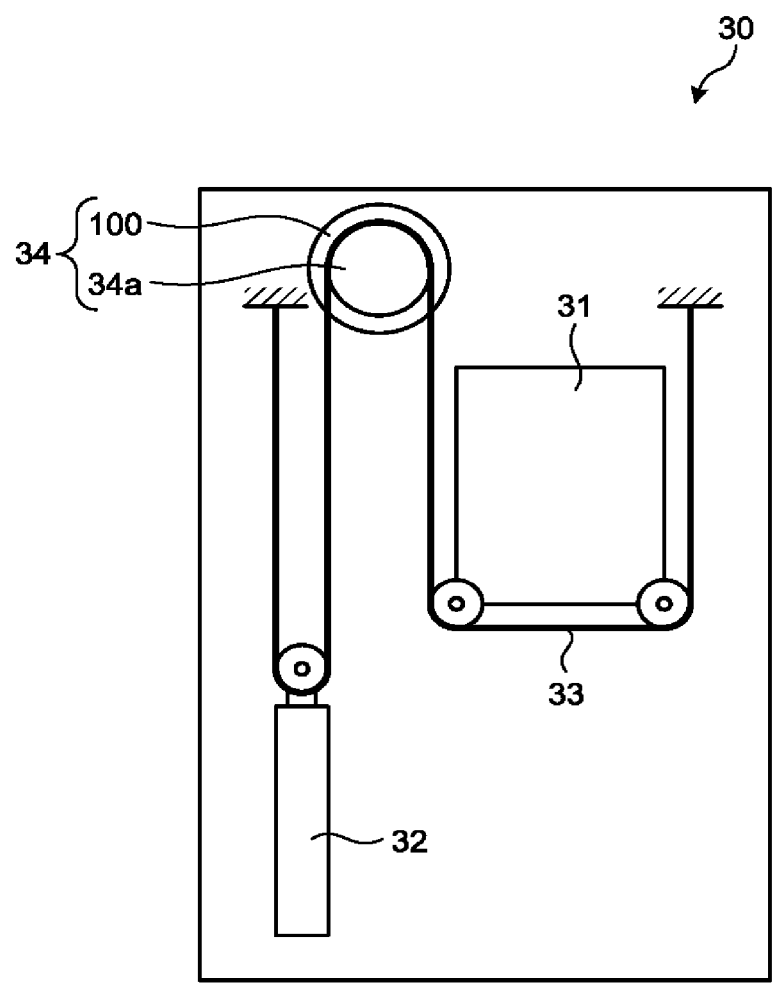
FIG. 20 is a schematic illustrating a general structure of an elevator including the electric rotating machine according to the embodiment.

FIG. 20 is a general schematic of a structure of an elevator 30 including the electric rotating machine 100. The elevator 30 (machine) may include the electric rotating machine 100 according to the first embodiment. In the example illustrated in FIG. 20, the elevator 30 includes a hoist machine 34, a car 31 (actuating unit), a counterweight 32, and a rope 33. The hoist machine 34 includes the electric rotating machine 100 and a sheave 34a. The rope 33 is wound around pulleys installed on the car 31, the sheave 34a (actuating unit) of the hoist machine 34, and a pulley on the counterweight 32. Both ends of the rope 33 are fixed to separate positions on a building, for example. When the electric rotating machine 100 serving as a motor of the hoist machine 34 operates, the sheave 34a is rotated by the torque generated by the electric rotating machine 100. The hoist machine 34 can bring up and down the car 31 by winding up and down the rope 33, using the frictional force between the sheave 34a and the rope 33. The hoist machine 34 can also be said to be one example of the machine.

The electric rotating machine 100 according to the first embodiment may be applied to any lifting device other than the elevator 30, e.g., to a crane.

Application Example in Robot

Figure 21:
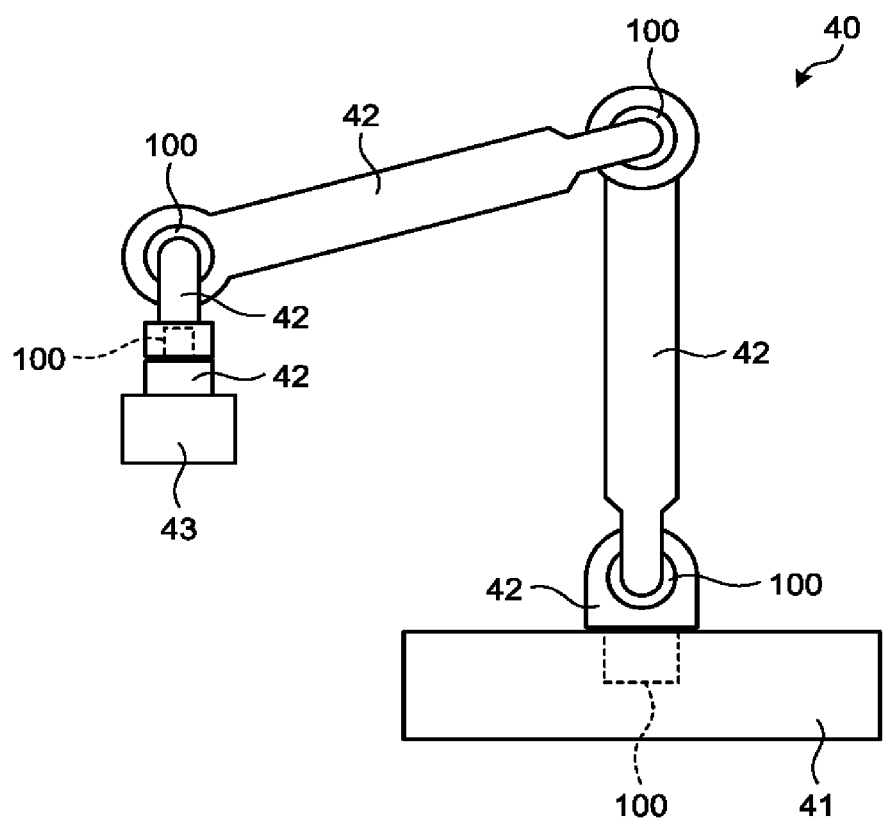
FIG. 21 is a schematic illustrating a general structure of a robot including the electric rotating machine according to the embodiment.

FIG. 21 is a general schematic of a structure of a robot 40 including the electric rotating machine 100. The robot 40 (machine) may include the electric rotating machine 100 according to the first embodiment. In the example illustrated in FIG. 21, the robot 40 is a multi-joint robot, and includes a base 41 and a plurality of movable parts 42 (actuating unit). The electric rotating machine 100 is provided to each joint where the two movable parts 42 are movably connected. The electric rotating machine 100 is fixed to one of the movable parts 42 in the joint, and rotates the other movable part 42, relatively with respect to the one movable part 42. By controlling the electric rotating machines 100, the robot 40 can access an object 43 at some position, or convey the object by controlling a position, an orientation, and an operation (e.g., a moving speed) of the movable part 42 that is positioned at the tip of the multi-joint arm.

The electric rotating machine 100 according to the first embodiment may be applied to any robots, in general, other than the robot 40, typical examples of which are a parallel link robot, an orthogonal robot, a running (walking) robot, and an assist robot.

Furthermore, the electric rotating machine 100 according to the first embodiment may be installed in any machine other than those described above, such as machines in general, electric machines, transportation machines, and precision machines.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electric rotating machine comprising:
a stator element;
a rotor element that is rotatable about a rotation axis; and
a housing that houses the stator element and the rotor element, and that is provided with an electric insulating portion on a part of or whole of an inner surface that extends in an axial direction of the rotation axis, wherein
the stator element and the electric insulating portion are provided at different positions in the axial direction, and
the electric insulating portion is a layer-like portion that extends in the axial direction.

2. The electric rotating machine according to claim 1, wherein the electric insulating portion is an electric insulation film or an applied electric insulating agent.

3. The electric rotating machine according to claim 1, wherein
the housing includes a recessed portion on the inner surface, and
the electric insulating portion is formed in the recessed portion.

4. The electric rotating machine according to claim 1, wherein the electric insulating portion includes one or more gaps that extend in at least one of an axial direction of the rotation axis and a rotating direction of the rotation axis.

5. The electric rotating machine according to claim 1, wherein the electric insulating portion has a structure in which one or more steel sheets having an electric insulating portion on at least a part of an outer surface of the steel sheets are laminated in an axial direction of the rotation axis or a rotating direction of the rotation axis.

6. The electric rotating machine according to claim 4, wherein
the housing includes a recessed portion on the inner surface, and
the electric insulating portion is formed in the recessed portion.

7. The electric rotating machine according to claim 5, wherein the electric insulating portion has a structure in which a plurality of steel sheets are integrally laminated in the axial direction or the rotating direction, or a structure in which one or more steel sheets are integrally laminated in a spiral shape along the axial direction.

8. The electric rotating machine according to claim 5, wherein the electric insulating portion includes one or more steel sheets integrally laminated in a spiral shape along the axial direction.

9. An electric rotating machine system comprising:
the electric rotating machine according to claim 1;
a driving circuit that supplies power to the electric rotating machine; and
a control unit that controls an operation of the driving circuit.

10. A vehicle comprising the electric rotating machine according to claim 1.

11. A power generator comprising the electric rotating machine according to claim 1.

12. A lifting device comprising the electric rotating machine according to claim 1.

13. A robot comprising the electric rotating machine according to claim 1.

14. The electric rotating machine according to claim 1, wherein the electric insulating portion includes one or more gaps that extend in a rotating direction of the rotation axis.

* * * * *